Aug. 28, 1956
H. F. OLTZ
2,760,344
AUTOMATIC FEED FOR ICE CREAM FREEZERS
Filed July 16, 1954
2 Sheets-Sheet 1
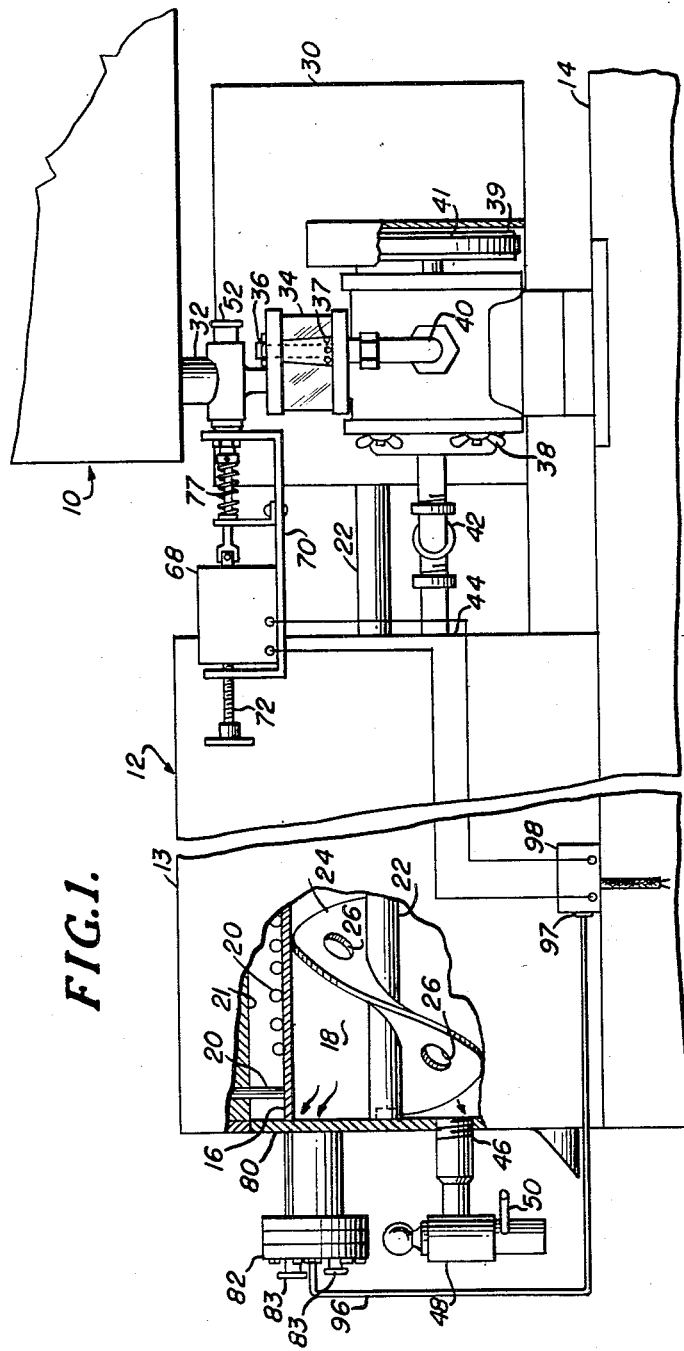
INVENTOR
HAROLD F. OLTZ
BY *Cushman, Darby & Cushman*
ATTORNEYS Aug. 28, 1956     H. F. OLTZ     2,760,344
AUTOMATIC FEED FOR ICE CREAM FREEZERS
Filed July 16, 1954     2 Sheets-Sheet 2

INVENTOR
HAROLD F. OLTZ

United States Patent Office 2,760,344
Patented Aug. 28, 1956

2,760,344

AUTOMATIC FEED FOR ICE CREAM FREEZERS

Harold F. Oltz, Miami, Fla., assignor to Ar-Tik Systems, Inc., Miami, Fla., a corporation of Indiana Application July 16, 1954, Serial No. 443,945

7 Claims. (Cl. 62—2)

The present invention relates to a freezing and dispensing apparatus and, more particularly, to improvements in the control of the feed of liquid material to the freezing chamber of the apparatus.

Heretofore, machines for freezing frozen food products, such as frozen custard or ice cream, have incorporated manual means for introducing the frozen product to the freezing chamber of the apparatus from the source of supply upon demand. The prior systems also incorporated automatic means for controlling the delivery of the product to be frozen, the means operating in response to the amount of frozen product discharged from the system or to the density of the product caused by refrigeration.

An object of the present invention is the provision of an automatic feed for a freezing and dispensing apparatus which will control the feed of the product to be frozen dependent upon the pressure of the frozen product within the freezing chamber.

Another object of the present invention is the provision of a freezing and dispensing apparatus wherein the freezing chamber of the apparatus develops a pressure in the frozen product at the discharge end of the apparatus, the variance of this pressure being utilized to control the feed of liquid product to the intake end of the apparatus from a source of supply.

Still another object of the present invention is the provision of a method of controlling the delivery of the product to be frozen depending upon the condition of the product within the freezing chamber caused by the quantity of frozen product within the freezing chamber so that a useable frozen product can be delivered at all times.

Still another object of the present invention is the provision of a system for feeding a product to be frozen to the apparatus, the apparatus being constantly operated with intermittent or no discharge of contents. By properly controlling the feed of the liquid material to be frozen, the freezing and dispensing machine will not stall or build up undue pressure in the discharge end thereof.

A still further object of the present invention is the provision of a system for controlling the feed of liquid material to a freezing and dispensing machine which is simple in construction, easy to install, and insures economical and efficient operation when dispensing either large or small quantities of the frozen product intermittently.

These and other objects of the present invention will be apparent from the disclosure in the accompanying specification, claims and drawings in which:

Figure 1 is a schematic view of the system for controlling the feed of liquid material to be mixed and frozen, parts of the freezer being shown in detail;

Figure 2 is a wiring diagram of the electrical circuit which controls operation of the infeed valve;

Figure 6 is a fragmentary view showing a modification of the means for adjusting the stroke of the solenoid, and Figure 7 is a view taken on the line 7—7 of Figure 6.

Figure 3:
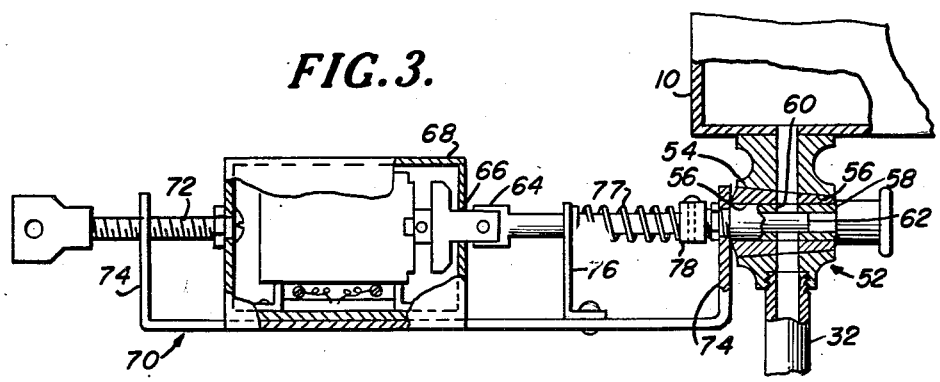
Figure 3 is an enlarged detail view of the infeed valve and the solenoid which operates the same, portions of the valve and solenoid being in cross-section.

Referring specifically to the drawings and particularly to Figure 1, the present invention includes a reservoir generally indicated at 10 for holding a supply of the liquid material to be frozen, and a freezing and dispensing apparatus 12 wherein the liquid from reservoir 10 is mixed and frozen. The freezing and dispensing apparatus 12 is of a type similar to that disclosed in United States Patent No. 2,080,971, issued May 18, 1937, to Harry M. Oltz. Reservoir 10 and freezing and dispensing apparatus 12 may be supported on any suitable frame or table as indicated at 14.

Freezing and dispensing apparatus 12 is elongated in shape and provide with an outer shell or casing 13 made of suitable material such as stainless steel or the like. Housed within casing 13 is a horizontally positioned freezing cylinder 16 having freezing and mixing chamber 18. Casing 13 is provided with walls 21 which are made of suitable insulation material, the walls 21 being spaced from cylinder 16. Surrounding cylinder 16 in the space between walls 21 and the cylinder are refrigeration coils 20 which are supplied with a suitable refrigerant from refrigeration apparatus (not shown). Mounted centrally of freezing cylinder 16 is a horizontal rotatable shaft 22 on which is mounted a helical conveyor 24 for beating and mixing the liquid material, as well as conveying the material from the intake to the discharge end of chamber 18 as it is being frozen. The helical conveyor 24 is provided with a plurality of apertures 26 between the shaft and its outer edge.

Rotation of helical conveyor 24, as previously stated, conveys material from the inlet port to the dispensing or discharge end of chamber 18. The material will be mixed and frozen as it is conveyed through chamber 18 and by the time it reaches the delivery end of the chamber, it will be completely frozen. Continued rotation of conveyor 24 will cause a pressure to be developed in the frozen product at the discharge end of chamber 18. To prevent the pressure of the frozen product from developing so high as to stall the conveyor, the apertures 26 are provided to release the pressure and, thus, pressure in the frozen product will not develop above a predetermined amount. Apertures 26 also aid in the mixing and beating of the material as it is conveyed through chamber 18 so that by the time the material reaches the discharge end of the chamber and is frozen, it is thoroughly mixed.

Conveyor 24 may be provided with a plurality of longitudinal scraper blades or bars on its outer periphery such as shown in Harry M. Oltz's United States Patent No. 2,506,101, issued May 2, 1950. As disclosed in this patent, the scraper blades remove the frozen mix from the interior wall of the freezer in order that it may comingle with the other frozen material, and thus, the rotation of conveyor 24 will not be retarded.

Shaft 22 extends out of the inlet end of the freezing and dispensing machine through suitable bearings (not shown) and is adapted to be driven by an electric motor 28 (Figure 2) supported in a housing 30. The circuit for continuously driving the electric motor 28 is disclosed in Figure 2 and it will be seen that the circuit is a single line type utilizing a source of 220 volts D. C. The numeral 100 represents the hot lead to motor 28 while the ground line is represented by the numeral 101. A switch 103 is provided in the hot lead 100 as a resistance 105 depending on the type of electric motor used.

A discharge line or pipe 32 extends downwardly from the bottom of reservoir 10 to a transparent cup 34 and liquid from reservoir 10 will be conveyed through line 32 to the cup 34 by gravity. The cup 34 which also acts as a sight glass is provided with a hollow member 36 open at its upper end to atmosphere and at its lower end to a line 40. Member 36 has laterally extending apertures 37 at the bottom thereof. Cup 34 permits air to simultaneously mix with the liquid when the liquid flows by gravity from the cup through apertures 37 to a positive displacement rotary pump 38. Sight cup 34 is substantially similar to that disclosed in the aforementioned Oltz Patent No. 2,080,971. A line 40 from the bottom of cup 34 connects the cup with the intake side of pump 38. A line or pipe 42 connects the discharge side of pump 38 with the intake 44 of cylinder 16 of freezing and dispensing apparatus 12. Pump 38, as shown in Figure 1, is provided with a drive wheel 39 which is connected to a pulley (not shown) mounted on the drive shaft of motor 28 by means of a drive belt 38. In other words, motor 28, which continuously drives conveyor 24, also is utilized to drive feed pump 38.

At the discharge end of cylinder 18, a discharge port 46 is provided and a draw off valve 48 is mounted in the discharge port 46. Draw off valve 48 is of the type disclosed in my copending United States application Serial No. 379,578, filed September 11, 1953, now abandoned, and is manually operated by the handle 50 to dispense a charge of frozen product to a container, cup or cone.

Mounted in line 32 is a shut-off valve 52 which controls the flow of material from reservoir 10 to freezing and dispensing apparatus 12. Referring to Figure 3, shut-off valve 52 includes a tapered plexiglass sleeve 54 adapted to be received in a tapered bore 56 in a fitting in the line 32. Tapered sleeve 54 is provided with a bore 56 in which is mounted a tubular collar 58 having a transverse bore 60 therethrough which aligns with the bore in line 32.

Mounted within collar 58 for reciprocating movement is a valve element or plunger 62. Plunger 62 is adapted to close the bore 60 so that liquid from reservoir 10 cannot flow therefrom to sight glass 34, pump 38 and freezing and dispensing machine 12. Plunger 62 is connected at 64 to the operating arm 66 of a solenoid 68. Solenoid 68, which is supported on a U-shaped bracket or base member 70 is responsive to the pressure of the frozen product in chamber 18 as will be explained in more detail later in the specification. The solenoid unit 68 is slidable on bracket 70 so that the stroke of plunger 62 may be adjusted to vary the amount of liquid permitted to pass through the valve when valve 52 is in the open position. To provide for the adjustment of the stroke of plunger 62, solenoid 68 is provided with a threaded stud 72 extending from one end thereof and adapted to be threaded through one of the upstanding ends 74 of U-shaped bracket 70. By rotation of stud 72, the longitudinal position of solenoid 68 can be varied on the base of U-shaped bracket 70 and, consequently, the stroke or effective opening of plunger 62 can be adjusted.

Figures 6 and 7 show a modified means for adjusting the stroke or effective opening of plunger 62. As disclosed in Figures 6 and 7, solenoid 68 is mounted on a bracket 70'. Bracket 70' is provided with a longitudinally extending elongated slot 150. A pin 152 extends from the base of solenoid 68 through slot 150. A knurled knob 154 is rotatably mounted on bracket 70' and is provided with a curved slot or cam surface 156. The lower end of pin 152 extends into slot 156 and, thus, rotation of knurled knob 154 will cause pin 152 to follow the cam 156 and, thus, move solenoid 68 longitudinally on bracket 70'.

Mounted intermediate the ends 74 of bracket 70 is an upwardly extending member 76 having an aperture therein through which plunger 62 extends. Mounted between member 76 and a collar 78 on rod 62 is a spring 77 for spring urging the valve to the closed position.

Figure 4:
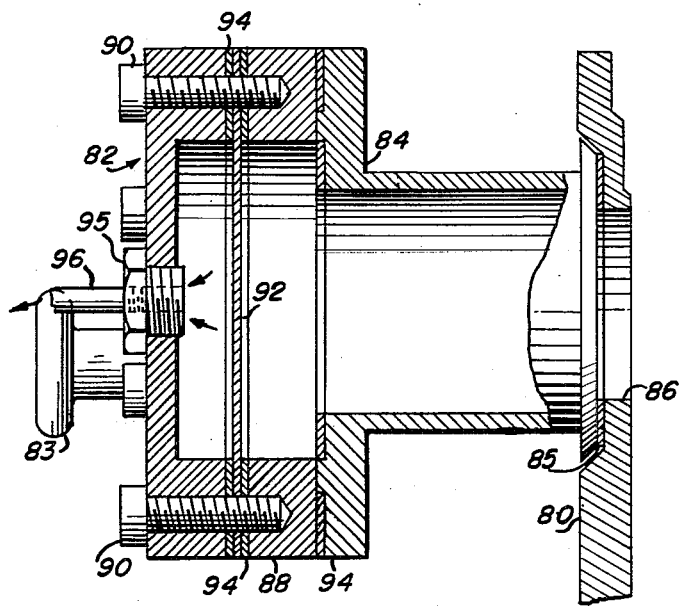
Figure 4 is an enlarged cross-sectional detail view of the diaphragm device responsive to conditions within the interior of the freezing and dispensing machine.

The discharge end of freezing and dispensing apparatus 12 is usually provided with a door or plate 80 which permits entry into chamber 18 and into the area where the refrigerating coil 20 is located because oftentimes it is necessary and desirable to clean the interior of the freezing and dispensing unit. Mounted on the door 80 is the previously mentioned draw-off valve 48 and a diaphragm device or unit 82 shown in detail in Figure 4. Diaphragm unit 82 is secured to door 80 by means of two bolts 83. The diaphragm device 82 includes a flanged collar 84 which is adapted to align with an aperture 86 in door 80. A suitable gasket 85 is mounted between door 80 and collar 84 to prevent leakage of the frozen product. Mounted on flanged collar 84 is a sectioned cap member 88 which is bolted together by bolts 90 and supports a diaphragm 92. Suitable gaskets 94 are provided between flange member 84 and the sectioned cap member 88 as well as on either side of diaphragm 92. As will be easily seen in Figure 4, one side of diaphragm 92 is in open communication with the discharge end of chamber 18 and, thus, the pressure of the frozen product built up in the discharge end will be reflected on diaphragm 92. One end of a capillary tube 96 is connected to cap member 88, as indicated at 95, and is in open communication with the other side of diaphragm 92. Capillary tube 96 and the chamber on its side of the diaphragm are filled with a mixture of glycerine and water. The other end of capillary tube 96 is connected to a pressure responsive switch 98 (Figures 1 and 2) which may be a mercury or other suitable electric switch. Switch 98 controls the current to solenoid 68 and, thus, controls the operation of valve 52.

Figure 5:
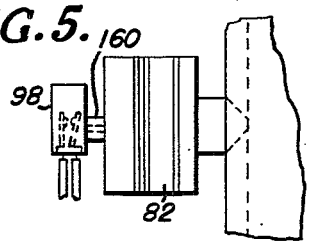
Figure 5 is a fragmentary view showing a modification of the mounting of the pressure responsive switch on the diaphragm device.

A modified form of the means for mounting pressure responsive switch 98 on the diaphragm device 82 is shown in Figure 5. Instead of using a capillary tube between the diaphragm device 82 and the pressure responsive switch 98, the pressure responsive switch is mounted on the face of diaphragm device 82 by means of a short piece of tubing 160. Tube 160 has a small orifice therethrough so that the pressure responsive switch 98 is in communication with one of the chambers in diaphragm device 82. A mixture of glycerine and water is used in the chamber on the switch side of diaphragm 92 so that movement of the diaphragm will be reflected to switch 98.

As will be seen from the wiring diagram in Figure 2, when there is a decrease in pressure of frozen product within chamber 18, the decrease in pressure is reflected on diaphragm 92 causing the fluid in capillary tube 92 to close switch 98. Switch 98 is connected to the hot line 100 in the circuit to motor 28. The solenoid 68 is wired in series with switch 98 and, consequently, upon closing switch 98, solenoid 68 energizes and valve 52 is opened.

The operation of the device may be described as follows:

Liquid material in supply tank or reservoir 10 flows by gravity through valve 52 when opened to pump 38 from where it is pumped to chamber 18 of freezing and dispensing apparatus 12. Conveyor 24, which is continuously rotated on the rotating shaft 22 by motor 30, conveys the liquid material from the inlet 44 toward the discharge end port 46 of freezing and dispensing apparatus 12. Rotation of conveyor 24 mixes and beats the liquid material as it is being conveyed longitudinally in the chamber 18 while cooling coils 20 freeze the material. By the time the material reaches the discharge end of chamber 18, the material is substantially frozen and ready for dispensing into containers or cones. The conveyor 24, which has its peripheral edge substantially in contact with the interior wall of cylinder 16, causes pressure to be built up in the frozen product at the discharge end of chamber 18. This pressure will build up a predetermined amount and because of apertures 26 in conveyor 24, any excess pressure will be relieved. In other words, under optimum operating conditions a substantially constant pressure is built up in the discharge end of chamber 18.

As the frozen product is withdrawn from chamber 18 through draw-off valve 48, the pressure will be maintained substantially constant within limits by conveyor 24 until such time that enough product has been withdrawn so that the conveyor cannot build up a sufficient pressure. When this condition occurs, the diaphragm 92 in the diaphragm device 82 will reflect the pressure change on the glycerine-water mixture in capillary tube 96 thus permitting switch 98 to close. When switch 98 closes, solenoid 68 is energized moving plunger 62 to the right of Figure 3 and, thus, permitting the liquid material to be conveyed by gravity to pump 38. The pump in turn will pump the material into chamber 18 and when the pressure of the frozen product at the discharge chamber 18 builds back up to its predetermined maximum, the diaphragm 92 will operate in the opposite direction causing fluid in the capillary tube 96 to open switch 98. When switch 98 is open, solenoid 68 is de-energized and spring 77 will urge the plunger to return to the closed position shown in Figure 3, thus, closing off the flow of liquid to pump 38.

As shown in Figure 1, pump 38 is driven by a belt drive 41 which in turn is driven off of a pulley (not shown) attached to the motor which continuously operates conveyor 24. Of course, pump 38 could have an independent source of power and could be operated only at such time as when valve 52 is opened.

By providing a system as just previously described, the operator will merely have to start the system up at the beginning of each period of operation and the system will be self-operating with the exception of the draw-off valve 48. The continuously rotating conveyor 24 will maintain a predetermined pressure in chamber 18 at the discharge end thereof for a varying quantity of frozen product within the cylinder. However, when this quantity falls below a predetermined amount, the pressure in the discharge end will reduce and as previously mentioned the system for feeding new mix to the chamber is operated. It will be noted that intermittent dispensing of the frozen product by means of draw-off valve 48 does not necessarily mean that valve 52 will be open to allow liquid to be supplied to chamber 18 to replace that being dispensed. In other words, the feed of liquid material is controlled by pressure of the frozen product and this pressure is not affected by intermittent dispensing but only after a substantial amount of frozen product has been dispensed.

The terminology used in the specification is for the purpose of description and not limitation, the scope of the invention being defined in the claims.

I claim:

1. In a system for controlling the feed of material to a freezing and dispensing apparatus of the type having a freezing cylinder with intake and discharge ports at opposed ends thereof and a mechanism for conveying material entering the intake port to the discharge port while it is being frozen: a source of material to be frozen, fluid connecting means between said source of material and the intake port of the cylinder of the freezing and dispensing machine, a pressure responsive device mounted on the discharge end of said cylinder and responsive to the pressure of material caused by the mechanism for delivering the material to the discharge port, a pressure actuated switch connected to said pressure responsive device, said switch being closed when the pressure reflected on said pressure responsive device decreases, a solenoid energized by said pressure actuated switch when the switch is closed, a valve in said fluid connecting means, said valve being operable to the open position when said solenoid is energized thereby permitting flow of material from said source of material to the cylinder of the freezing and dispensing apparatus.

2. A system of the character described in claim 1 wherein said pressure responsive means is a diaphragm mounted on the discharge end of said cylinder and having one side thereof in open communication with the interior of the cylinder and the other side thereof connected to said pressure actuated switch by means of a capillary tube.

3. In an apparatus for mixing and freezing a material, a freezing cylinder with intake and discharge ports at opposed ends thereof, a continuously rotating screw conveyor mounted within said freezing cylinder for mixing and transferring the material from the intake port thereof toward the discharge port thereof, said continuously rotating screw including means for releasing excess pressure in the discharge end of said freezing cylinder above a predetermined maximum amount, a source of material to be mixed and frozen, fluid connecting means between said source of material and the intake port of said cylinder, pump means for pumping material through said fluid connecting means to said freezing cylinder, a valve mounted in said fluid connecting means, pressure responsive means positioned on the discharge end of said cylinder and responsive to the pressure of material within said cylinder at the discharge end thereof, said pressure responsive means being connected to said valve to open the same when there is a decrease of pressure of the material at the discharge end of said cylinder to a predetermined pressure less than the predetermined maximum pressure developed in the discharge end of said cylinder.

4. An apparatus of the character described in claim 3 including a pressure actuated switch, a solenoid, energized by the closing of said pressure actuated switch, said solenoid being connected to said valve for operating the same to permit flow of material from said source to the interior of said cylinder, and wherein said pressure responsive device includes a diaphragm having one side thereof in open communication to the interior of said cylinder at the discharge end thereof, and means connecting the other side of said diaphragm to said pressure actuated switch whereby a decrease in pressure of the frozen material within said cylinder causes said switch to be closed.

5. A freezing and dispensing machine comprising a freezing cylinder having intake and discharge ports at opposed ends thereof, a reservoir for a source of supply of material to be frozen, means connecting said reservoir with the intake port of said cylinder, said means including a solenoid operated valve and a pump for pumping material from the reservoir to said cylinder, means within said cylinder for conveying the material entering said intake port toward the discharge end of said cylinder and for creating a pressure in the frozen material at the discharge end of said cylinder to a predetermined amount so long as there is a substantial amount of material within said cylinder, and means mounted on the discharge end of said cylinder and responsive to the pressure within said cylinder for energizing and actuating said solenoid operated valve when the pressure in the discharge end of said cylinder drops below a predetermined amount.

6. A device of the character described in claim 5 wherein said solenoid operated valve is adjustable to vary the amount of material transferred from said reservoir to said cylinder.

7. A device of the character described in claim 5 wherein said means mounted on the discharge end of said cylinder is a diaphragm having one side in open communication with the interior of said cylinder, the other side of said diaphragm being connected to a capillary tube, a pressure responsive switch connected to said capillary tube and actuated in response to a change in pressure as reflected by said diaphragm, said pressure actuated switch being connected to said solenoid operated valve.

References Cited in the file of this patent

UNITED STATES PATENTS

| | | |
|---|---|---|
| 1,693,677 | Swift | Dec. 4, 1928 |
| 1,965,616 | Vogt | July 10, 1934 |
| 2,522,648 | Tacchella | Sept. 19, 1950 |
| 2,559,032 | Tacchella | July 3, 1951 |
| 2,687,019 | Swenson | Aug. 24, 1954 |